(12) United States Patent
Knutson

(10) Patent No.: US 12,551,671 B2
(45) Date of Patent: Feb. 17, 2026

(54) SURGICAL DILATORS AND ASSEMBLIES AND METHODS THEREOF

(71) Applicant: Covidien LP, Mansfield, MA (US)

(72) Inventor: Nathan J. Knutson, Long Lake, MN (US)

(73) Assignee: Covidien LP, Mansfield, MA (US)

( * ) Notice: Subject to any disclaimer, the term of this patent is extended or adjusted under 35 U.S.C. 154(b) by 1115 days.

(21) Appl. No.: 17/476,510

(22) Filed: Sep. 16, 2021

(65) Prior Publication Data
US 2023/0087843 A1   Mar. 23, 2023

(51) Int. Cl.
*A61M 29/00* (2006.01)
*A61B 17/32* (2006.01)
*A61M 25/00* (2006.01)

(52) U.S. Cl.
CPC ..... *A61M 29/00* (2013.01); *A61B 17/320016* (2013.01); *A61M 25/0082* (2013.01)

(58) Field of Classification Search
CPC .............. A61M 29/00; A61M 25/0082; A61M 25/0068; A61M 25/008; A61B 17/320016; A61B 17/3478; A61B 1/018; A61B 1/2676
See application file for complete search history.

(56) References Cited

U.S. PATENT DOCUMENTS

| | | |
|---|---|---|
| 4,543,092 A | 9/1985 | Mehler et al. |
| 5,665,102 A | 9/1997 | Yoon |
| 5,817,034 A | 10/1998 | Milliman et al. |
| 5,843,048 A | 12/1998 | Gross |
| 5,843,108 A | 12/1998 | Samuels |
| 6,027,514 A | 2/2000 | Stine et al. |
| 6,213,957 B1 | 4/2001 | Milliman et al. |
| 6,902,535 B2 | 6/2005 | Eberhart et al. |
| 7,048,696 B2 | 5/2006 | Eberhart et al. |
| 7,657,325 B2 | 2/2010 | Williams |
| 8,043,312 B2 | 10/2011 | Noriega et al. |
| 8,092,395 B2 | 1/2012 | Lupton et al. |
| 8,137,342 B2 | 3/2012 | Crossman |
| 8,500,656 B2 | 8/2013 | Lupton |
| 8,764,684 B2 | 7/2014 | Lupton |
| 9,114,228 B2 | 8/2015 | Zook et al. |
| 9,636,480 B2 | 5/2017 | Sevensma |
| 9,844,392 B2 | 12/2017 | Arts et al. |
| 9,844,650 B2 | 12/2017 | Lupton |
| 10,252,027 B2 | 4/2019 | Pillai et al. |
| 10,413,707 B2 | 9/2019 | Douglas |
| 10,603,071 B1 | 3/2020 | Whitman et al. |
| 10,813,665 B1 | 10/2020 | Whitman et al. |
| 2002/0169471 A1 | 11/2002 | Ferdinand |

(Continued)

FOREIGN PATENT DOCUMENTS

WO   2009094463 A2   7/2009

OTHER PUBLICATIONS

Extended European Search Report issued in European Patent Application No. 24151223.5 dated Jul. 16, 2024.

(Continued)

*Primary Examiner* — Anh T Dang
(74) *Attorney, Agent, or Firm* — Weber Rosselli & Cannon LLP

(57) ABSTRACT

The present disclosure describes surgical dilators including a multi-faceted shaped tip and methods of use associated therewith.

16 Claims, 14 Drawing Sheets

(56) References Cited

U.S. PATENT DOCUMENTS

| | | |
|---|---|---|
| 2004/0039305 A1 | 2/2004 | Eberhart et al. |
| 2005/0228314 A1 | 10/2005 | Eberhart et al. |
| 2007/0032744 A1 | 2/2007 | Lupton |
| 2009/0093801 A1 | 4/2009 | Crossman |
| 2009/0125030 A1* | 5/2009 | Tebbe ................ A61B 17/3468 |
| | | 606/191 |
| 2010/0268029 A1 | 10/2010 | Phan et al. |
| 2012/0029652 A1 | 2/2012 | Wagh |
| 2018/0064914 A1 | 3/2018 | Douglas |
| 2018/0325502 A1 | 11/2018 | Swader |
| 2019/0183600 A1 | 6/2019 | Fumex et al. |
| 2020/0129330 A1 | 4/2020 | Mastel |
| 2020/0146651 A1 | 5/2020 | Horst et al. |
| 2022/0110515 A1* | 4/2022 | Grogan ................ A61M 29/02 |

OTHER PUBLICATIONS

Partial European Search Report issued in European Patent Application No. 22195908.3 dated Mar. 1, 2023.

* cited by examiner

SURGICAL DILATORS AND ASSEMBLIES AND METHODS THEREOF

BACKGROUND

Technical Field

The present technology is generally related to surgical dilators, and more particularly, surgical dilators designed for accessing targets located beyond a defined luminal body structure and including enhanced cutting characteristics.

Description of Related Art

A variety of surgical dilators have been developed. Of these known devices, each has certain advantages and disadvantages. However, there is an ongoing need to provide alternative surgical dilators and methods of using such surgical dilators. For example, as shown in FIGS. 1A and 1B, some surgical dilators 1 may include a distal end in the form of a truncated cone 2 defining a lumen 3 therethrough for the passage of a guidewire 4. Such surgical dilators may display difficulty accurately accessing a target residing off-lumen or outside a given bodily lumen. Particularly, such surgical dilators are designed to be simply forced or pushed through a tissue lumen wall which can lead to sudden and/or uncontrolled advances into unwanted tissues near the target and/or lumen. For example, in an effort to overcome the viscoelastic forces associated with the wall tissue, a dilator may accidently lurch forward after breaking through the wall. This sudden movement or lurching is not easy to prevent and may create potential risk to the patient by accidently puncturing a nearby blood vessel and/or producing a pneumothorax. This can cause usability and/or user confidence of these devices to be reduced and/or suffer.

In addition, when particularly directed to navigating the various lumens of the lung, known dilators may be stiffer than the guide catheter and/or endoscope they are forced or pushed through to penetrate the lumen wall. A stiff surgical dilator may cause a straightening and/or misalignment of the guide catheter and/or endoscope during advancement and/or after alignment within the tissue has been established. This straightening may not only cause a misalignment with the target but may also account for the surgical dilator to advance at an oblique angle preventing proper tissue puncture or a glancing blow of the dilator. Thus, there exists a need to provide surgical dilators which can be more accurately controlled, require less force to advance through the lumen regardless of stiffness, and decrease the likelihood of misalignment during advancement.

SUMMARY

The present disclosure describes surgical dilators configured for passage through a natural lumen wall to an off-lumen target tissue or lesion. The surgical dilators may be configured to be rotated without causing the surgical dilator from becoming misaligned. However, the surgical dilators described herein may be configured to be advanced through tissue with or without rotation.

The surgical dilators described herein includes a control handle operably coupled to an elongate tubular body. The tubular body extends between a proximal end portion and a distal end portion defining a dilator lumen extending from a proximal opening at the proximal end portion to a distal opening at the distal end portion. A tapered multi-faceted shaped tip extends between a base portion and a lead portion, the base portion connected to the distal end portion of the tubular body. The tip may include a tip lumen extending between a tip base opening and tip lead opening, the tip base open aligned and/or in fluid communication with dilator lumen, and particularly the distal opening of the dilator lumen. The control handle is positioned on the proximal end portion of the tubular body. The control handle may be configured to push and/or rotate the tubular body and the distal tip along and/or about a longitudinal axis thereof.

Methods for deploying the surgical dilators to an off-lumen lesion are also provided. One method includes positioning a surgical dilator through a lumen of a patient to a selected exit point in a wall of the lumen near the off-lumen lesion, the surgical dilator may be configured to be rotated and includes a multi-faceted shaped tip, rotating the surgical dilator and the multi-faceted tip, via the handle operably coupled thereto outside the patient, through the wall of the lumen; and creating and/or navigating a path beyond the lumen to the off-lumen lesion by rotating and/or advancing the surgical dilator outside beyond the lumen and in a direction towards the lesion.

BRIEF DESCRIPTION OF THE DRAWINGS

Various aspects and features of the present disclosure are described herein below with reference to the drawings, wherein.

DETAILED DESCRIPTION

Figure 1A:
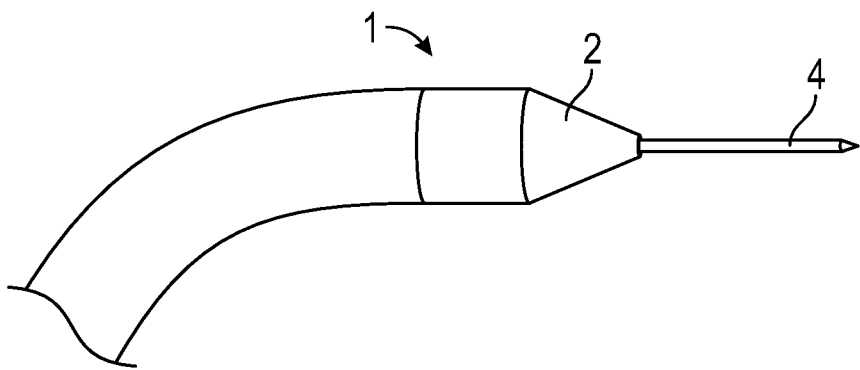
FIGS. 1A and 1B depict a side view and front end view, respectively, of a known surgical dilator.
Figure 1B:
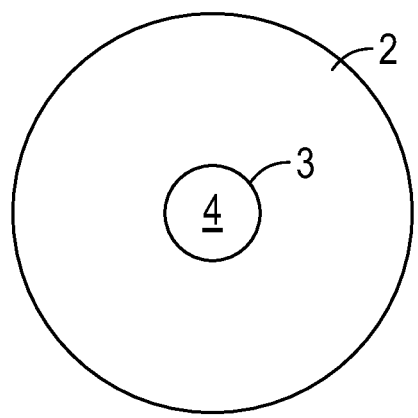

Detailed embodiments of the present disclosure are disclosed herein; however, the disclosed embodiments are merely examples of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Aspects of the present disclosure are described in detail with reference to the drawing figures wherein like reference numerals identify similar or identical elements. As used herein, the term "distal" refers to the portion that is being described which is further from a user, while the term "proximal" refers to the portion that is being described which is closer to a user.

Figure 2A:
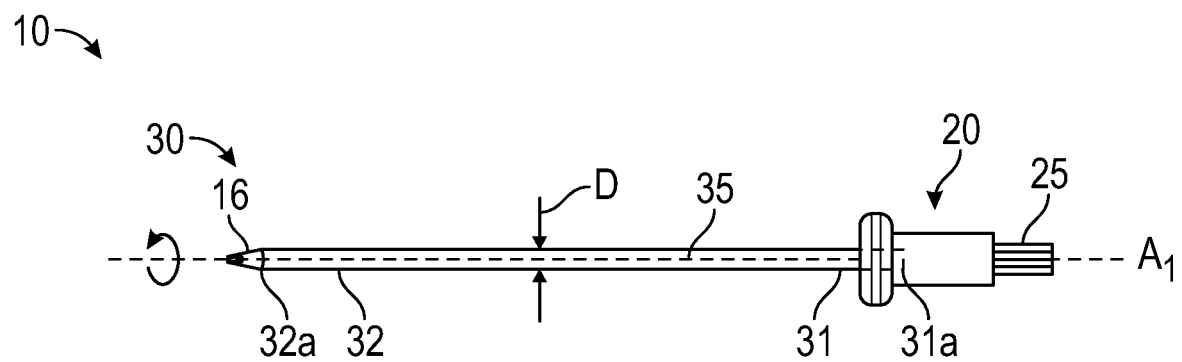
FIG. 2A depicts a side view of a surgical dilator as described in at least one embodiment herein.

The present disclosure is directed in part to a surgical dilator catheters configured for improved off-lumen deployment. FIG. 2A depicts a surgical dilator 10 as provided herein. The surgical dilator 10 includes a control handle 20 (e.g., handle portion) operably coupled to a flexible elongate tubular body 30 (e.g., body portion). The elongate tubular body 30 extends between a proximal end portion 31 and a distal end portion 32. The proximal end portion 31, and/or particularly the proximal-most portion 31a, is secured to a portion of the control handle 20. The distal end portion 32, and/or particularly the distal-most end 32a, has a multi-faceted shaped tip 16 extending distally therefrom. The tip 16 including a plurality of major and/or minor sides defining a plurality of major and/or minor cutting edges, shown in more detail in FIGS. 3A-11.

The control handle 20 is configured to rotate the entire tubular body 10, including the distal tip 16, about its longitudinal axis $A_1$ (as indicated by the arrow). The control handle 20 may be manually-operated or power operated. The control handle 20 may be directly operably coupled to the tubular body 30 or indirectly operably coupled to the tubular body via one or more coupling devices.

Figure 2B:
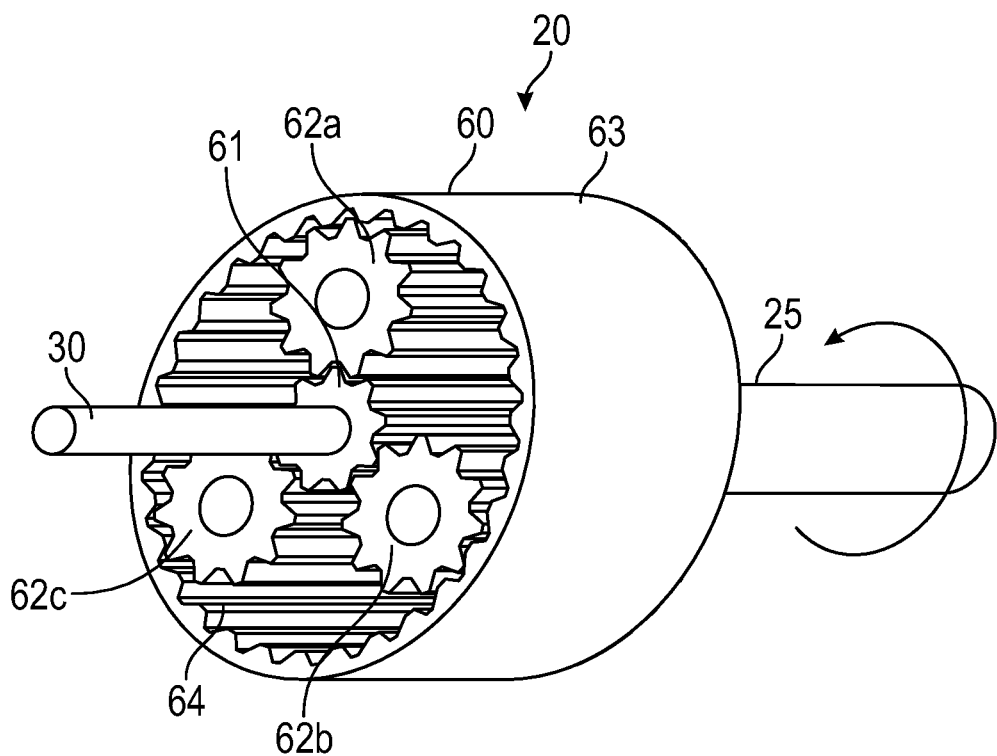
FIG. 2B depicts a schematic perspective view of a handle portion of the surgical dilator of FIG. 2A as described in at least one embodiment herein

As shown in FIG. 2B, in some embodiments, the control handle 20 includes at least a rotatable grip 25 operably coupled to one or more gears 60, including but to limited to a planetary gear. A planetary gear 60 includes a central sun gear 61 surrounded by a plurality of planetary gears 62a-c held on a carrier 63 and enclosed within an outer gear ring 64. By rotating the grip 25 (see arrow), the one or more gears 60 are caused to rotate in a manner which causes the tubular body 30 to rotate about its longitudinal axis $A_1$. The speed and/or torque associated with the spinning tubular body may be controlled by how the body, the handle and the gear are operably coupled. For example, as shown in FIG. 2B, in some embodiments, the tubular body 30 may be coupled to the central sun gear 61 via either direct attachment or indirect attachment via a shaft coupler, overmold, or press-in coupler. In such embodiments, the control handle 20 may be coupled to the outer gear 64 which is coupled to the central sun gear 61 via planetary gears 62a-c. Rotation of the rotatable grip 25 causes the outer gear 64 to rotate at a given speed, which further causes the other inner gears to rotate at a higher speed and potentially a lower torque than the outer gear 64. An increase in rotational speed and/or reduction in torque may be employed to achieve high relative displacement of the tip 16 in rotation relative to axial advancement without rotation thereby requiring less force on the tip 16 to advance through and/or cut through the tissue. In some embodiments, the speed ratio of the outer gear 64 to the central sun gear 61 may be 1:2, 1:3, 1:5, 1:10, 1:20, 1:50, 1:100 and/or the torque ratio of the outer gear 64 to the central sun gear 61 may be 100:1, 50:1, 20:1, 10:1, 5:1, 3:1, 2:1. One example of such a gear may include a speeder gear box.

In still other embodiments, the body 30 may be coupled to the outer gear 64 via either direct attachment or indirect attachment via a shaft coupler, overmold, or press-in coupler. In such embodiments, the control handle 20 may be coupled to the central sun gear 61 which is coupled to the outer gear 64 via planetary gears 62a-c. Rotation of the rotatable grip 25 causes the central gear 61 to rotate at a given speed, which further causes the other outer gears to rotate at a lower speed and potentially a higher torque than the central sun gear 61. In some embodiments, the speed ratio of the central sun gear 61 to the outer gear 64 may be 100:1, 50:1, 20:1, 10:1, 5:1, 3:1, 2:1 and/or the torque ratio of the central sun gear 61 to the outer gear 61 may be 1:2, 1:3, 1:5, 1:10, 1:20, 1:50, 1:100.

The tubular body 30 generally defines one or more dilator lumens 35 extending from a proximal end portion 31 to a distal end portion 32 of the body 30. The tubular body may be made from any combination of suitable biocompatible materials. Some non-limiting examples include polymeric materials, such as polycarbonates polyamides, polyethylene, polypropylene, polystyrene, PEEK, and the like, and/or metals, such as stainless steel, gold, silver, platinum, tungsten, as well as shape memory materials such as nitinol.

As further depicted in FIG. 2A, the tubular body 30 may maintain a constant diameter D (or thickness for non-circular embodiments) along the entire length of the tubular body 30, not necessarily including the tapered distal tip 16 and/or any proximal portion of the tubular body 31a directly coupled to the handle portion 20. The diameter D may range from about 0.02 to about 0.04 inches, and/or particularly, in some embodiments from about 0.025 to about 0.035 inches. Such a tubular body may further be configured to display a constant stiffness along the entire length of the body, again not necessarily including the distal tip and/or any proximal portion directly coupled to the handle portion.

The tubular body may define a length ranging from about 10 cm to about 500 cm. In some embodiments, the length of the tubular body may be from about 20 cm to about 400 cm. In still other embodiments, the length of the tubular body may be from about 50 cm to about 300 cm. In still yet other embodiments, the length of the tubular body may be from about 125 cm to about 250 cm.

Figure 3A:
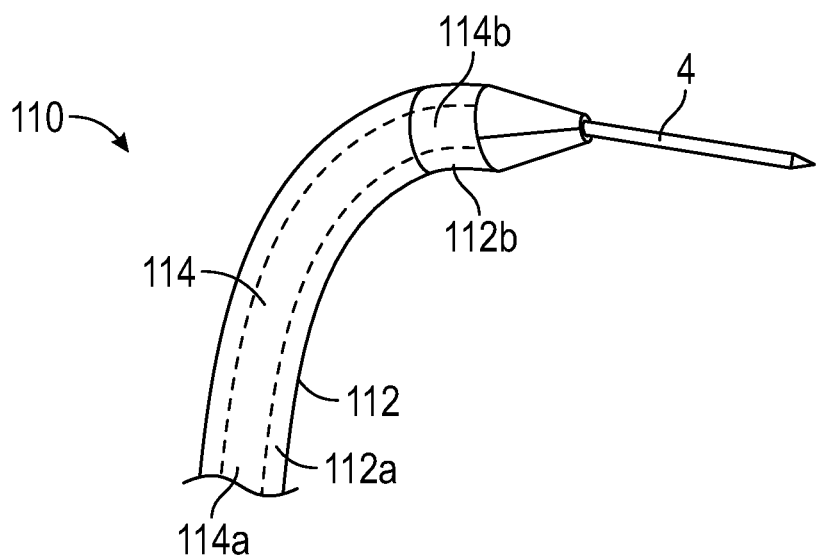
FIGS. 3A and 3B depict a side view and front end view, respectively, of a surgical dilator as described in at least one embodiment herein.
Figure 3B:
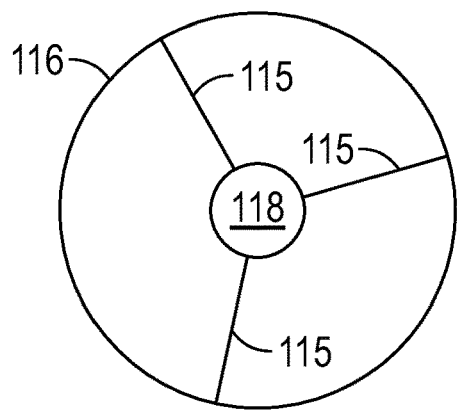
Figure 3C:
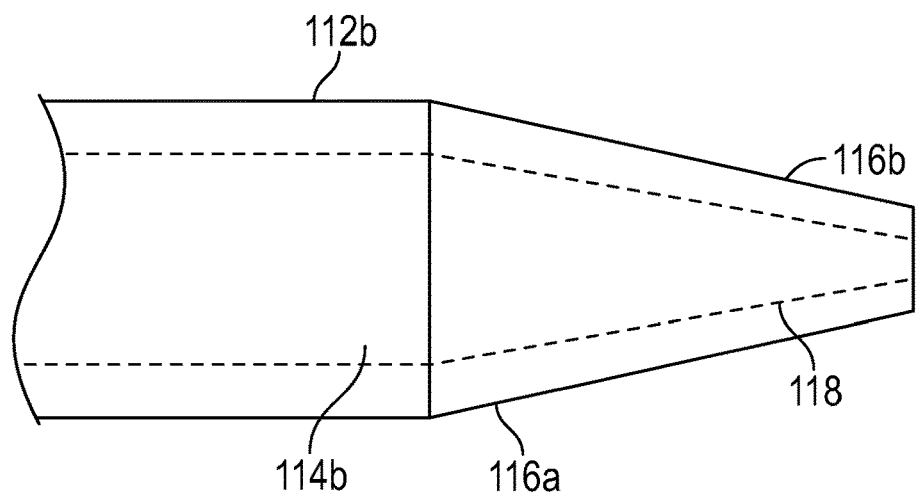
FIG. 3C depicts a cross-sectional view of the surgical dilator of FIG. 3A as described in at least one embodiment herein.

Turning to FIGS. 3A-3C, the surgical dilator 110 includes a tubular body 112 configured for creating an off-lumen pathway to a target tissue, e.g., lesion. The pathway being subsequently used for the passage therethrough of one or more guidewires, guide catheters, and/or surgical instruments to treat, image, and/or biopsy the target tissue.

FIGS. 3A-3C depict a surgical dilator 110 as provided in at least one embodiment herein. The surgical dilator 110 includes a tubular body 112 extending between a proximal end portion 112*a* and a distal end portion 112*b*. The dilator 110 may include a dilator lumen 114 extending from a proximal opening 114*a* at the proximal end portion 112*a* to a distal opening 114*b* at the distal end portion 112*b*. A tapered multi-faceted shaped tip 116 extends distally from the distal end portion 112*b* of the body 112.

As specifically depicted in FIG. 3B, in some embodiments, the tapered multi-faceted shaped tip 116 may include three or more facets, i.e., cutting edges 115. In some embodiments, the tapered multi-faceted shaped tip 116 may include three facets and/or cutting edges 115 to form a tapered tri-faceted shaped body.

The tapered multi-faceted shaped tip 116 may also include a tip lumen 118 extending therethrough. The tip lumen 118 configured to longitudinally align with the distal opening 114*b* of the dilator lumen 114. In some embodiments, as depicted in FIG. 3C, the tip lumen 118 may taper from a proximal end portion 116*a* of the shaped tip 116 to the distal end portion 116*b* of the shaped tip 116.

Figure 4A:
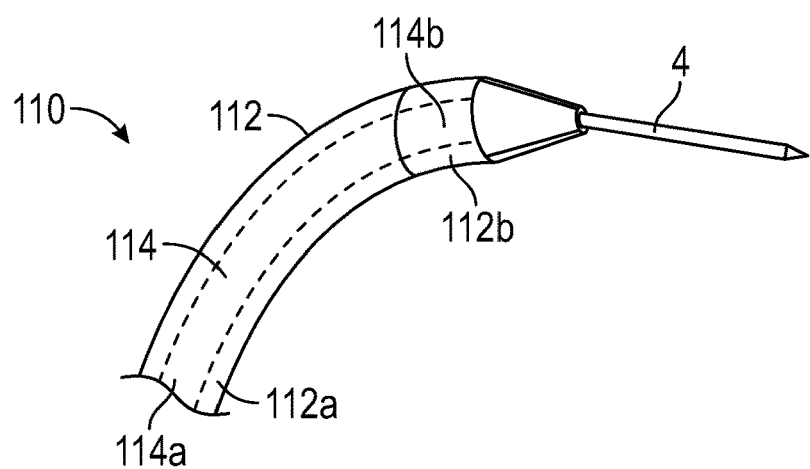
FIGS. 4A and 4B depict a side view and front end view, respectively, of a surgical dilator as described in at least one embodiment herein.
Figure 4B:
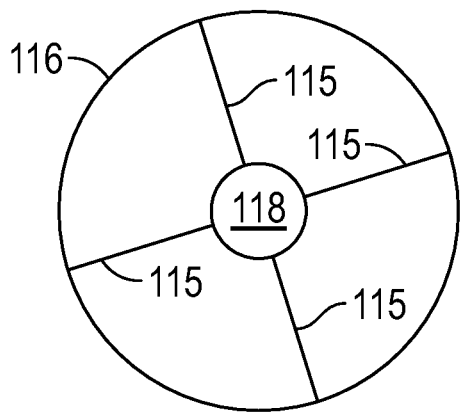
Figure 4C:
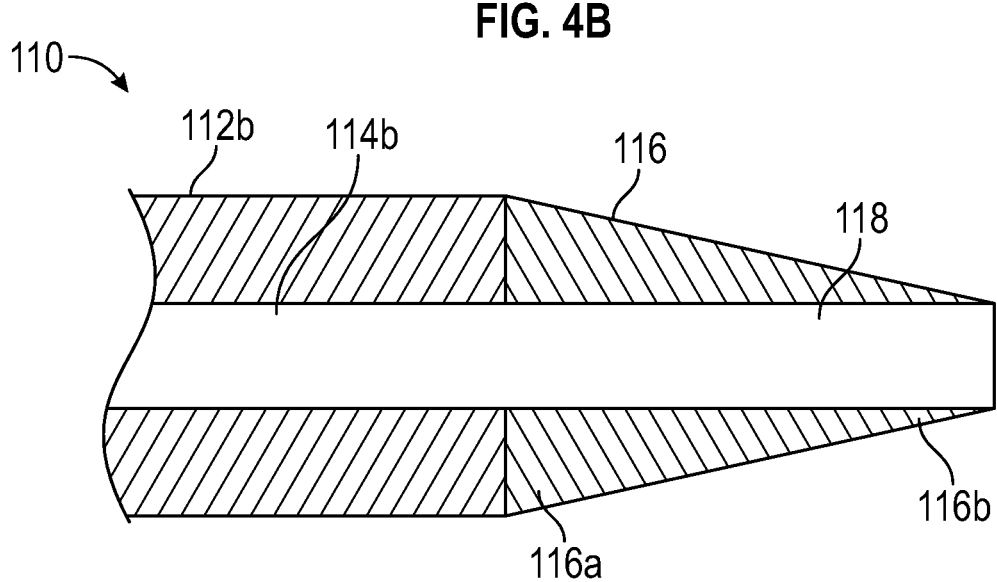
FIG. 4C depicts a cross-sectional view of the surgical dilator of FIG. 4A as described in at least one embodiment herein.

FIGS. 4A-4C also depict a surgical dilator 110 as provided in at least one embodiment herein. The surgical dilator 110 includes a tubular body 112 extending between a proximal end portion 112*a* and a distal end portion 112*b*. The dilator 110 may include a dilator lumen 114 extending from a proximal opening 114*a* at the proximal end portion 112*a* to a distal opening 114*b* at the distal end portion 112*b*. A tapered multi-faceted shaped tip 116 extends distally from the distal end portion 112*b* of the body 112.

As specifically depicted in FIG. 4B, in some embodiments, the tapered multi-faceted shaped tip 116 may include four or more facets and/or cutting edges 115. In some embodiments, the tapered multi-faceted shaped tip 116 may include four facets and/or cutting edges 115 to form a tapered tetra-faceted shaped body.

The multi-faceted shaped tip 116 may also include a tip lumen 118 extending therethrough. The tip lumen 118 configured to longitudinally align with the distal opening 114*b* of the dilator lumen 114. In some embodiments, as depicted in FIG. 4C, the tip lumen 118 may maintain a constant diameter and/or may not taper from a proximal end portion 116*a* of the shaped tip 116 to the distal end portion 116*b* of the shaped tip 116. The tip lumen 118 configured to receive, maintain, and/or pass a guidewire, guide catheter, and/or a surgical instrument therethrough.

Figure 5:
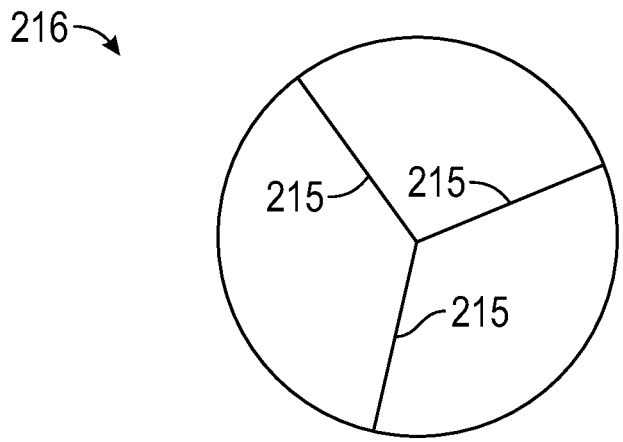
FIG. 5 depicts a front end view of a surgical dilator as described in at least one embodiment herein.

In some embodiments, as shown in FIG. 5, the tapered multi-faceted shaped tip 216 may not include a tip lumen. It is envisioned that in some embodiments the addition of the multiple facets 215, i.e., cutting edges, allows the surgical dilator catheter to independently pierce a tissue wall without the preliminary assistance of a guidewire. In such embodiments, it is envisioned that the distal tip may be configured to be pierced with one or more guidewires, guide catheters, and/or surgical instruments for passage therethrough or the distal tip may be removably fixed to the distal end portion of the tubular body to allow for the passage of the one or more guidewires, guide catheters, and/or surgical instruments therethrough.

FIGS. 6A-11B depict additional various non-limiting single-prong or multi-prong configurations of suitable tapered multi-faceted shaped tips. For example, FIGS. 6A-8 depict various multi-faceted shaped tips defining a multi-prong configuration, and/or particularly a two-prong configuration, while FIGS. 9A-11B depict various multi-faceted shaped tips defining a single-prong configuration.

In FIGS. 6A-8, the various depicted tapered multi-faceted shaped tips each include one or more major sides, minor sides, major cutting edges, minor cutting edges, and/or lead cutting edges. The major sides extend at least a predominant length of the shaped tip, while the minor sides extend less than a predominant length of the shaped tip. The minor sides are configured to be positioned between portions of two or more major sides, particularly between the lead part of two or more major sides. The major sides are larger in surface area than the minor sides, individually and/or collectively. The major cutting edges are located between neighboring major sides, while minor cutting edges are located between neighboring major and minor sides.

Figure 6A:
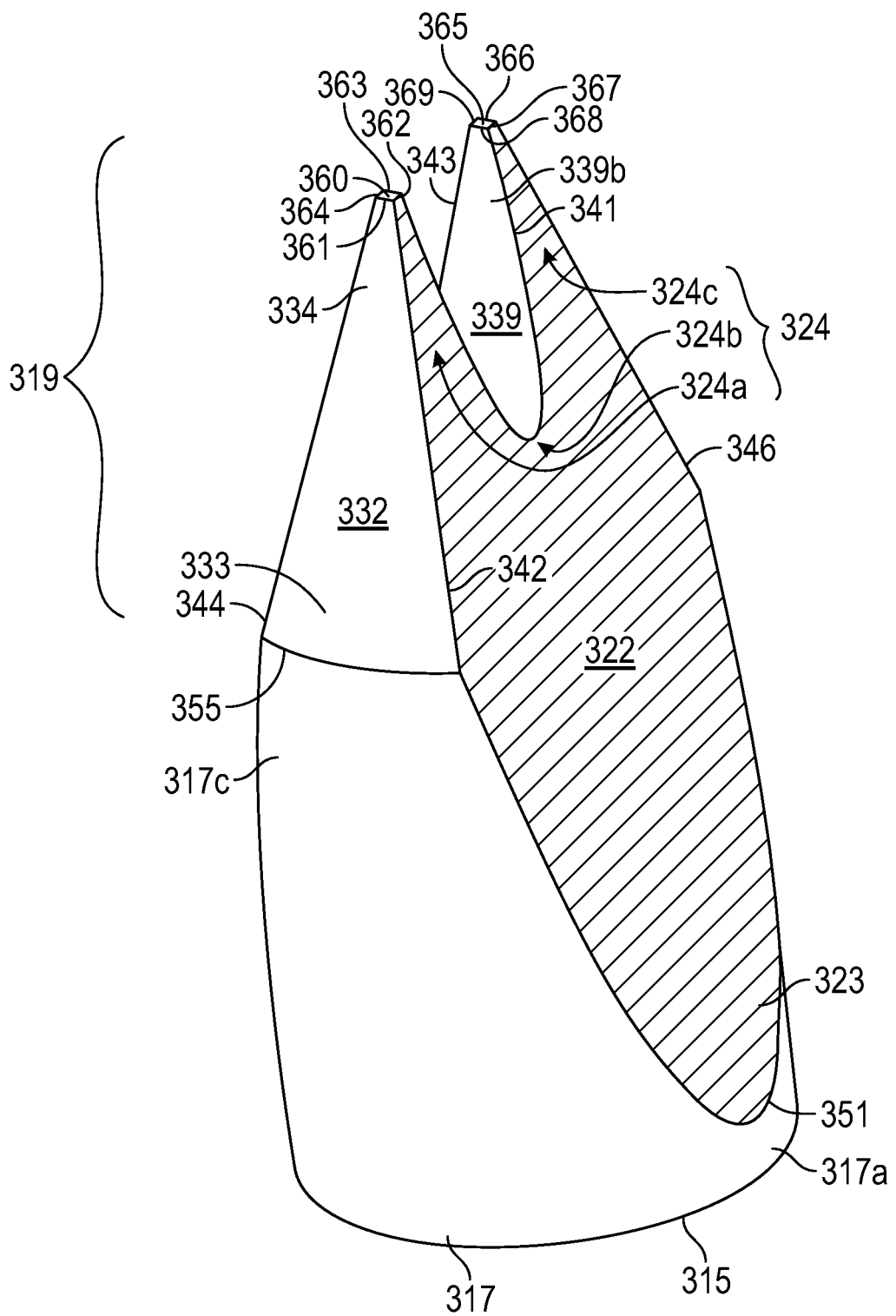
FIGS. 6A, 6B, and 6C depict a left perspective side view, a right perspective view, and top view, respectively, of a multi-faceted shaped body of a surgical dilator as described in at least one embodiment herein.
Figure 6B:
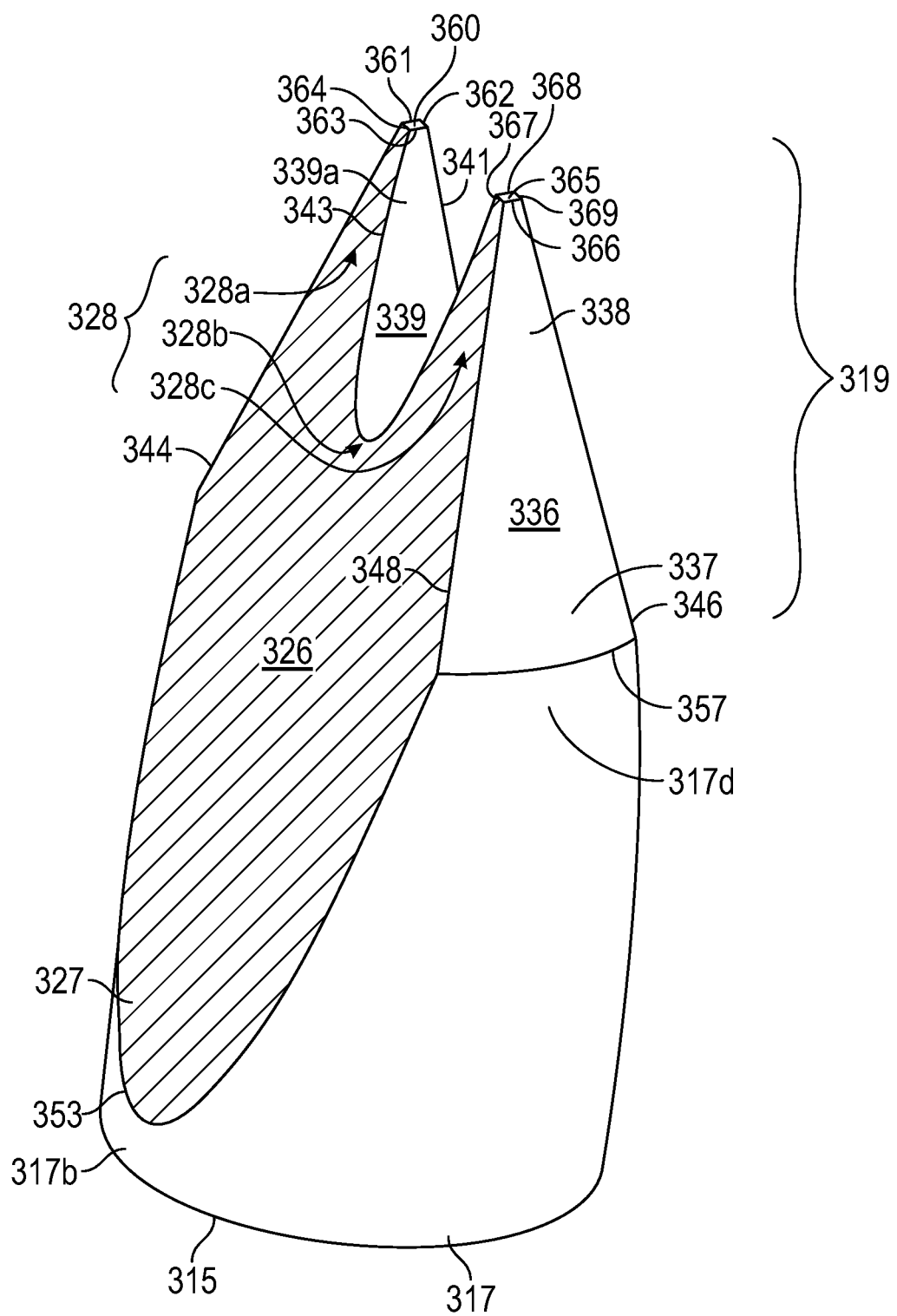
Figure 6C:
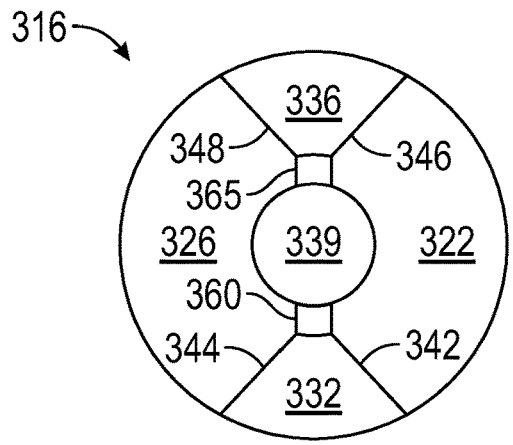

As depicted in FIGS. 6A-6C, in some embodiments of the multi-prong, e.g., two-prong, configuration, a tapered multi-faceted tip 316 as described herein may include a base portion 317, a lead portion 317, at least a first and second major sides 322, 326, and at least a first and second outer minor sides 332, 336. In such embodiments, the first major side 322 may extend between a first major base part 323 and a first major lead part 324. The first major base part 323 may be connected to a first part 317*a* of the base portion 317 of the tip 316 along a first major base cutting edge 351. The first major lead part 324 may include a first generally u-shaped lead part 324*b* positioned between a first outer lead part 324*a* and a second outer lead part 324*c*.

In such embodiments, the second major side 326 may extend between a second major base part 327 and a second major lead part 328. The second major base part 327 may be connected to a second part 317*b* of the base portion 317 of the tip 316 along a second major base cutting edge 353. The second major lead part 328 may include a second generally u-shaped lead part 328*b* positioned between a third outer lead part 328*a* and a fourth outer lead part 328*c*.

In such embodiments, the first outer minor side 332 may extend between a first minor base part 333 and a first minor lead part 324. The first minor base part 333 may be connected to a third part 317*c* of the base portion 317 of the tip 316 along a first outer minor base cutting edge 355. The second outer minor side 336 may extend between a second minor base part 337 and a second minor lead part 338, the second minor base part 337 connected to a fourth part 317*d* of the base portion 317 of the tip 316 along a second outer minor base cutting edge 357. In some embodiments, the first outer minor side 332 narrows distally from the first minor base part 333 to the first minor lead part 334 and/or the second outer minor side 336 narrows distally from the second minor base part 337 to the second minor lead part 338.

In such embodiments, the first and third outer lead parts 324*a*, 328*a* of the first and second major sides 322, 326 may be further connected to the first outer minor side 332 along a first and second outer minor cutting edge 342, 344, respectively, and the second and fourth outer lead parts 324*c*, 328*c* connected to the second outer minor side 336 along a third and fourth outer minor cutting edge 346, 348, respectively. In some embodiments, the first part 317*a* of the base portion 317 and the second part 317*b* of the base portion 317 are positioned on opposite sides of the base portion 317, and the third part 317*c* of the base portion 317 and the fourth 317*d* part of the base portion 317 are positioned on opposite sides of the base portion 317 different from the first and second parts 317*a*, 317*b*, wherein the first and second parts 317*a*, 317*b* of the base portion 317 may be proximal the third and fourth parts 317*c*, 317*d* of the base portion 317.

In such embodiments, the base portion 317 may be a rounded (e.g., circular, or elliptical) base portion from which one or more, if not all, the major sides 322, 326 and/or minor sides 332, 336 extend from. In some embodiments, the rounded base portion 317 extends distally from a base portion edge 315 to the first and second major base cutting edges 351, 353 and the first and second minor base cutting edges 355, 357.

As further depicted in FIGS. 6A-6C, in some embodiments of the multi-prong, e.g., two-prong, configuration, the multi-faceted tip 316 as described herein may further include a curved or u-shaped inner minor side 339, and/or one or more lead faces 360, 365. In such embodiments, the curved or u-shaped minor inner side 339 may connect the first and second u-shaped major lead parts 324b, 328b along first and second curved inner minor cutting edges 341, 343, respectively.

In such embodiments, the first lead face 360 may be connected to the first outer minor lead part 334 along a first outer minor lead cutting edge 361. In such embodiments, the first lead face 360 may also be connected to a first end 339a of the curved or u-shaped minor inner side 339 along a first inner minor lead cutting edge 363. In such embodiment, the first lead face 360 may further be connected to the first and third outer lead parts 324a, 328a along first and second major lead cutting edges 362, 364, respectively.

In such embodiments, the second lead face 365 may be connected to the second outer minor lead part 338 along a second outer minor lead cutting edge 366. In such embodiments, the second lead face 365 may also be connected to a second end 339b of the curved or u-shaped minor inner side 339 along a second inner minor lead cutting edge 368. In such embodiment, the second lead face 365 may further be connected to the second and fourth outer lead parts 324c, 328c along first and second major lead cutting edges 367, 369.

In some embodiments, at least one of the first lead face 360 and/or the second lead face 365 is a blunt, planar, and/or non-pointed face defined by four cutting edges, e.g., two opposing minor leading cutting edges 361, 363, 366, 368 and two opposing major leading cutting edges 362, 364, 367, 369. In some embodiments, the first and second lead faces 360, 365 extend generally perpendicular to a longitudinal axis of the tip 316.

In some embodiments, at least one, if not both, of the first and second major sides 322, 326 may be generally planar as the tip 316 narrows distally from the base portion 317. In some embodiments, at least one, if not both, of the first and second major sides 322, 326 may be concave as the tip 316 narrows distally from the base portion 317.

In some embodiments, at least one, if not both, of the first and second outer minor sides 332, 336 may be generally planar as the minor sides 332, 336 narrow distally from the base portion 317. In some embodiments, at least one, if not both, of the first and second outer minor sides 332, 336 may be generally convex as the minor sides 332, 336 narrow distally from the base portion 317.

Figure 7:
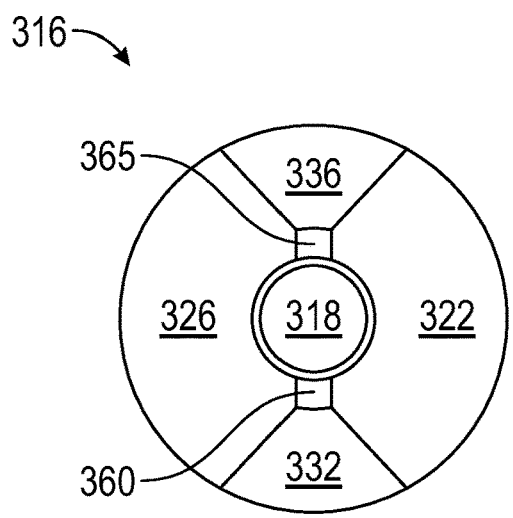
FIGS. 7 and 8 depict a top view of a multi-faceted shaped body of a surgical dilator as described in at least one embodiment herein.
Figure 8:
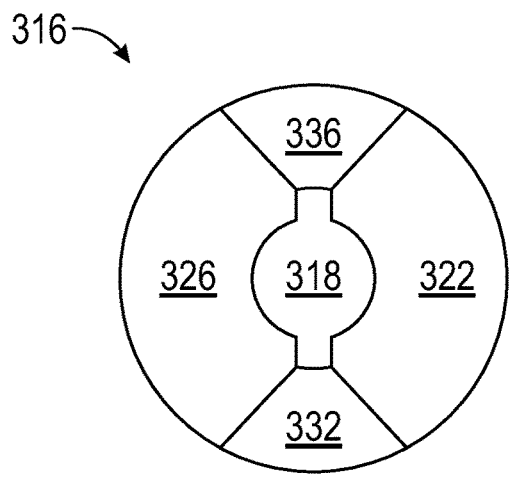

FIGS. 7 and 8 depict alternative embodiments of the multi-prong e.g., two-prong, configuration of FIGS. 6A-6C, wherein the shaped tip 316 further includes a tip lumen 318 extending longitudinally therethrough. For example, as shown in FIG. 7, in some embodiments, the multi-faceted shaped tip 316 of a surgical dilator may include the first and second opposing major sides 322, 326 positioned between the first and second opposing outer minor sides 332, 336, a generally u-shaped inner minor side 339 positioned between the first and second lead faces 360, 365, and each of the cutting edges associated therewith as described herein, wherein a tip lumen 318 is positioned, and/or generally centered, between the two lead faces 360, 365, and positioned through a base part of the u-shaped inner wall 339. In such embodiments, the tip lumen 318 is defined through a portion of the curved inner minor side 339 located between each prong of the two-prong configuration and set-back proximally from the lead face 360, 365 of each prong of the two-prong configuration.

In another example, as shown in FIG. 8, in some embodiments, the multi-faceted shaped tip 316 of a surgical dilator includes the first and second opposing major sides 322, 326 positioned between the first and second opposing outer minor sides 332, 336, and each of the cutting edges associated therewith as described herein, wherein the tip lumen 318 replaces at least one of the curved or u-shaped inner minor side, the first lead face, and/or the second lead face.

Turning to FIGS. 9A-11B, in some embodiments, the various depicted tapered multi-faceted shaped tips may form a single prong configuration each including one or more major sides, minor sides, lead faces, major cutting edges, minor cutting edges, and/or lead cutting edges.

Figure 9A:
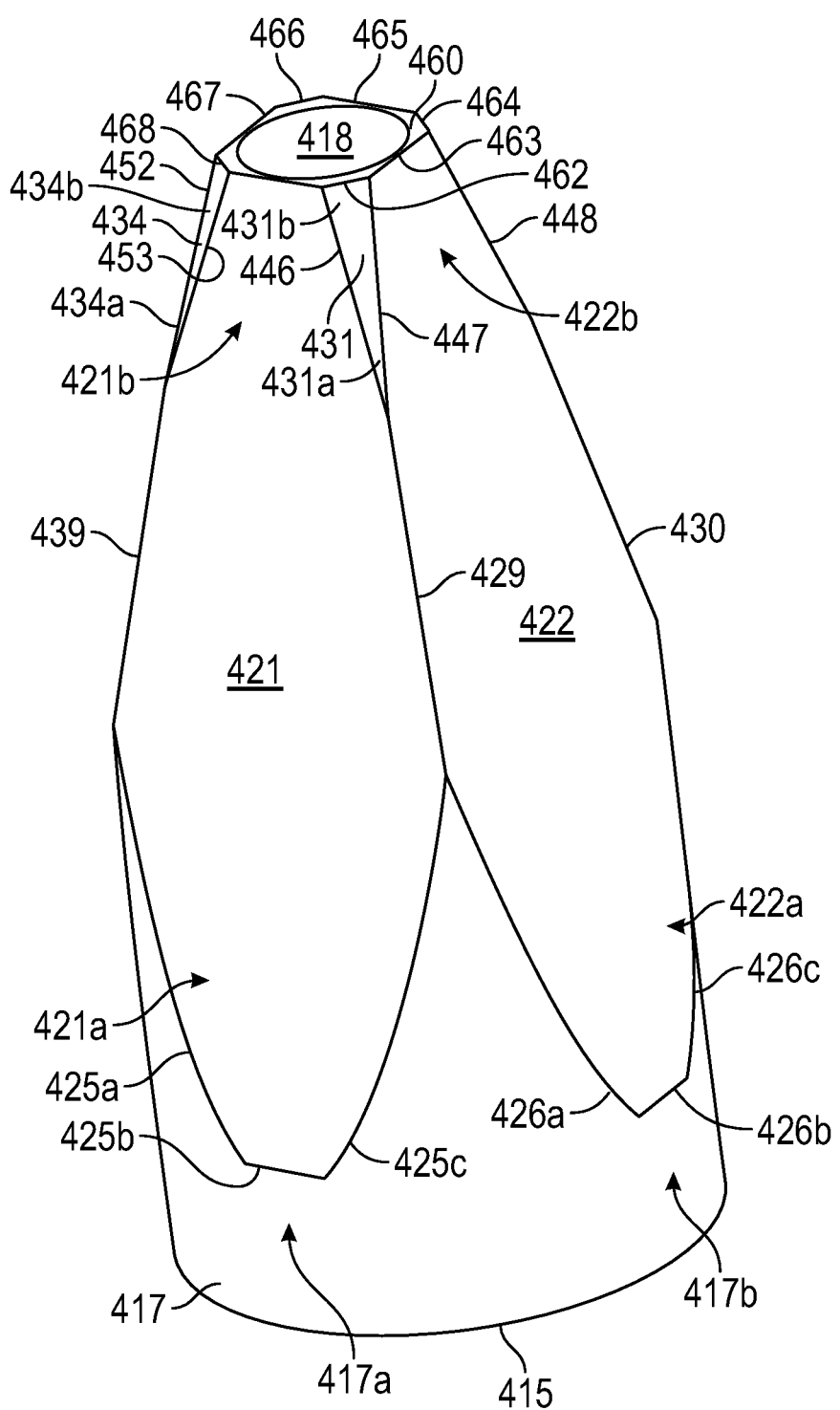
FIGS. 9A, 9B, and 9C depict a left perspective side view, a right perspective view, and top view, respectively, of a multi-faceted shaped body of a surgical dilator as described in at least one embodiment herein.
Figure 9B:
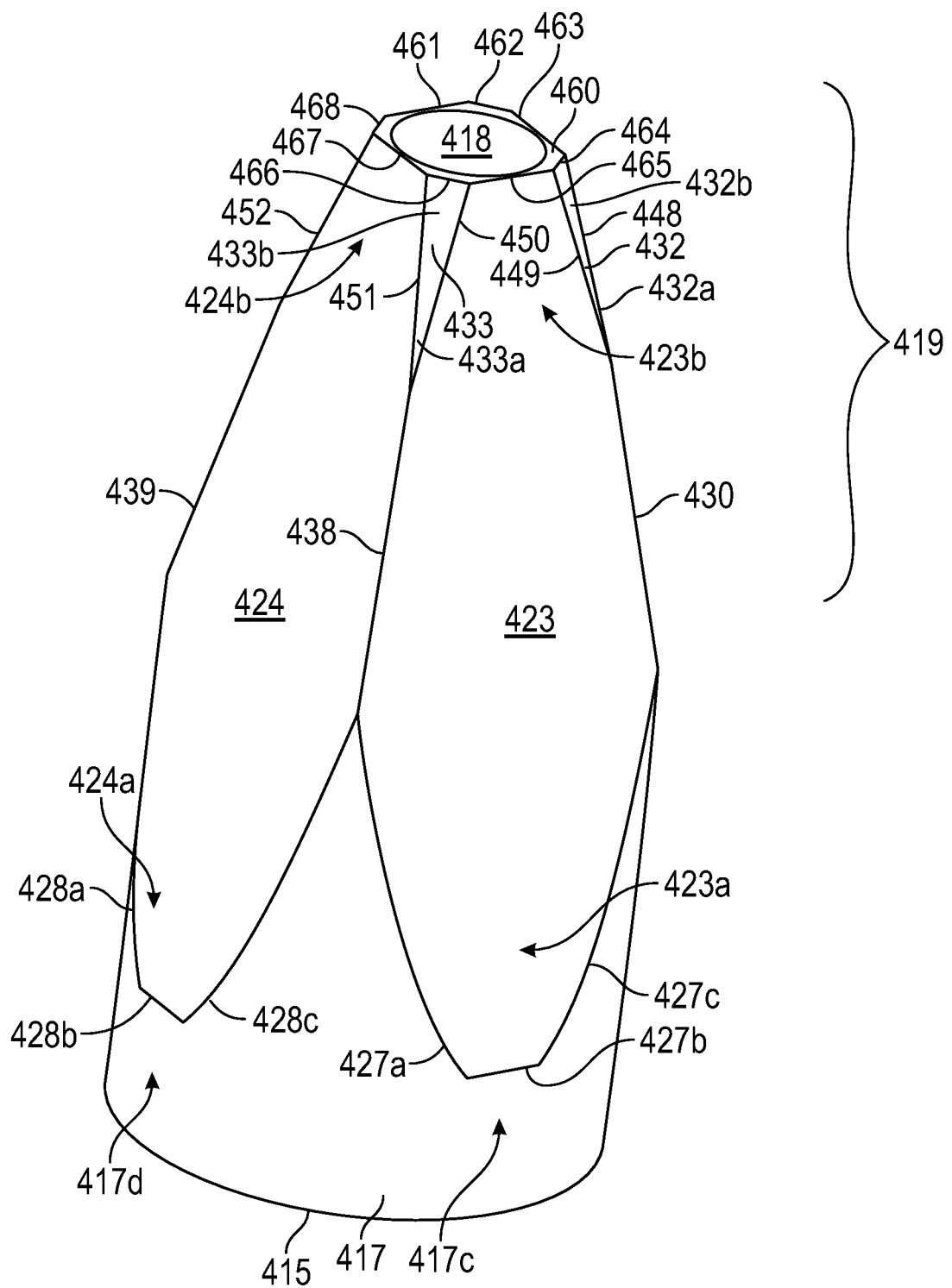
Figure 9C:
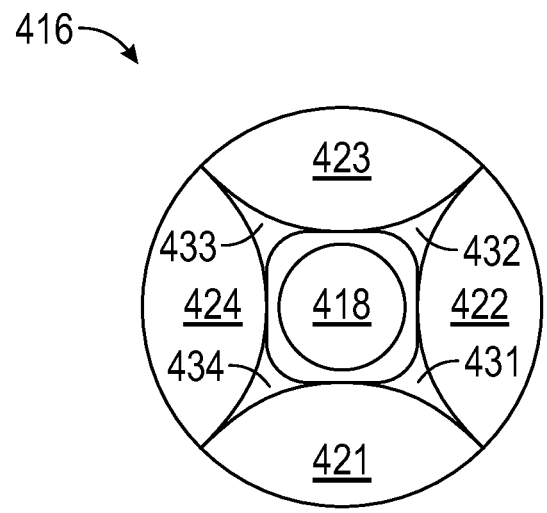

FIGS. 9A-9C, in some embodiments, the multi-faceted shaped tip 416 may form only a single prong configuration including a plurality of major sides 421, 422, 423, and 424 extending distally from a base portion 417 of the tip 416, a plurality of minor sides 431, 432, 433, and 434 positioned between a leading part 421b, 422b, 423b, and 424b of each of the major sides 421, 422, 423, and 424, a blunt lead face 460, a plurality of major, minor, and leading cutting edges 429-432, 446-453, 461-468, respectively, and a tip lumen 418 extending therethrough. In some embodiments, the leading parts 421b, 422b, 423b, and 424b of the plurality of major sides 421, 422, 423, and 424 alternate with the plurality of minor sides 431, 432, 433, and 434 around the lead portion 417 of the tip 416 forming alternating major leading cutting edges 461, 463, 465, 467 and minor leading cutting edges 462, 464, 466, 468, around the lead face 460. In some embodiments, the plurality of minor sides 431, 432, 433, and 434 do not extend from the base portion 417 and/or are separated from the base portion 417 by the major sides 421, 422, 423, and 424.

In the single prong configuration of FIGS. 9A-9C, the plurality of major sides may include at least a first, second, third, and fourth major side 421, 422, 423, and 424 wrapped circumferentially around the tip 416. Each of the four major sides 421, 422, 423, and 424 angle distally to collectively narrow the tip 416. The first, second, third, and fourth major sides 421, 422, 423, and 424 may also be connected to each other via first, second, third, and fourth major cutting edges 429, 430, 431, and 432. For example, in some embodiments, the first and second major sides 421, 422 are connected to each other along the first major cutting edge 429, the second and third major sides 422, 423 are connected to each other along the second major cutting edge 430, the third and fourth major sides 423, 424 are connected to each other along the third major cutting edge 431, and the fourth and first major sides 424, 421 are connected to each other along the fourth major cutting edge 432. The first, second, third, and fourth major cutting edges 429, 430, 431, and 432 may be distal to the major base cutting edges 425a-c, 426a-c, 427a-c, and 428a-c.

As depicted in FIGS. 9A-9C, in some embodiments of a single-prong configuration, a tapered multi-faceted tip 416 as described herein may extend between a base portion 417 and a lead portion 419, the tip 416 further including a lead face 460, a plurality of major sides (e.g., a first major side 421, a second major side 422, a third major side 423, and/or fourth major side 424), a plurality of minor sides (e.g., a first minor side 431, a second minor side 432, a third minor side 433, and/or fourth minor side 434), and a plurality of major, minor, and leading cutting edges 429-432, 446-453, 461-468, respectively.

In such embodiments, the tip 416 may include at least three, if not 4 or more, first major sides. A first major side 421 may extend between a first major base part 421a and a first major lead part 421b, the first major base part 421a connected to a first part 417a of the base portion 417 of the tip 416 along one or more first major base cutting edges 425a-c and the first major lead part 421b connected to the lead face 460 along a first major lead cutting edge 461. A second major side 422 may extend between a second major base part 422a and a second major lead part 422b, the second major base part 422a connected to a second part 417b of the base portion 417 of the tip 416 along one or more second major base cutting edges 426a-c and the second major lead part 422b connected to the lead face 460 along a second major lead cutting edge 463, the second major side 422 connected to the first major side 421 along a first major cutting edge 429 extending between the second major base part 422a and the second major lead part 422b. A third major side 423 may extend between a third major base part 423a and a third major lead part 423b, the third major base part 423a connected to a third part 417c of the base portion 417 of the tip 416 along one or more third major base cutting edges 427a-c and the third major lead part 423b connected to the lead face 460 along a third major lead cutting edge 465, the third major side 423 connected to the second major side 422 along a second major cutting edge 430 extending between the third major base part 423a and the third major lead part 423b. A fourth major side 424 may extend between a fourth major base part 424a and a fourth major lead part 424b, the fourth major base part 424a connected to a fourth part 417d of the base portion 417 of the tip 416 along one or more fourth major base cutting edges 428a-c and the fourth major lead part 424b connected to the lead face 460 along a fourth major lead cutting edge 467, the fourth major side 424 connected to the third major side 423 along a third major cutting edge 438 extending between the fourth major base part 424a and the fourth major lead part 424b. The first major side 421 may further be connected to the fourth major side 424 along a fourth major cutting edge 439 extending between the first major base part 421a and the first major lead part 421b.

Further, in such embodiments, the tip 416 may include at least three, if not 4 or more, first minor sides. A first minor side 431 may extend between a first minor base part 431a and a first minor lead part 431b, the first minor lead part 431b connected to the lead face 460 along a first minor lead cutting edge 462, the first minor side 431 connected to both the major lead part 421b of the first major side 421 along a first minor cutting edge 446 and the major lead part 422b of a second major side 422 along a second minor cutting edge 447. A second minor side 432 may extend between a second minor base part 432a and a second minor lead part 432b, the second minor lead part 432b connected to the lead face 460 along a second minor lead cutting edge 464, the second minor side 432 connected to both the major lead part 422b of the second major side 422 along a third minor cutting edge 448 and the major lead part 423b of the third major side 423 along a fourth minor cutting edge 449. A third minor side 433 extending between a third minor base part 433a and a third minor lead part 433b, the third minor lead part 433b connected to the lead face 460 along a third minor lead cutting edge 466, the third minor side 433 connected to both the major lead part 423b of the third major side 423 along a fifth minor cutting edge 450 and the major lead part 424b of the fourth major side 424 along a sixth minor cutting edge 451. A fourth minor side 434 extending between a fourth minor base part 434a and a fourth minor lead part 434b, the fourth minor lead part 434b connected to the lead face 460 along a fourth minor lead cutting edge 468, the fourth minor side 434 connected to both the major lead part 424b of the fourth major side 424 along a seventh minor cutting edge 452 and the major lead part 421b of the first major side 421 along a eighth minor cutting edge 453.

In some additional embodiments regarding a single prong configuration, one or more, if not all, of the plurality of minor sides (e.g., a first minor side 431, a second minor side 432, a third minor side 433, and/or fourth minor side 434) may widen distally towards the lead face 460. Some specific examples include the first minor side 431 widens distally from the first minor base part 431a to the first minor lead part 431b, the second outer minor side 432 widens distally from the second minor base part 432a to the second minor lead part 432b, the third outer minor side 433 widens distally from the third minor base part 433a to the third minor lead part 433b, and/or the fourth outer minor side 434 widens distally from the fourth minor base part 434a to the fourth minor lead part 434b.

In some additional embodiments regarding a single prong configuration, one or more, if not all, of the minor cutting edges 446-453 extend distally from one of the four major cutting edges 429, 430, 438, 439. Some specific examples include the first and second minor cutting edges 446, 447 extend distally from the first major cutting edge 429, the third and fourth minor cutting edges 448, 449 extend distally from the second major cutting edge 430, the fifth and sixth minor cutting edges 450, 451 extend distally from the third major cutting edge 438 and the seventh and eighth minor cutting edges 452, 453 extend distally from the fourth major cutting edge 439.

In some additional embodiments regarding a single prong configuration, the multi-faceted tip 416 may further include a tip lumen 418 positioned and/or passing through the lead face 460.

Figure 10:
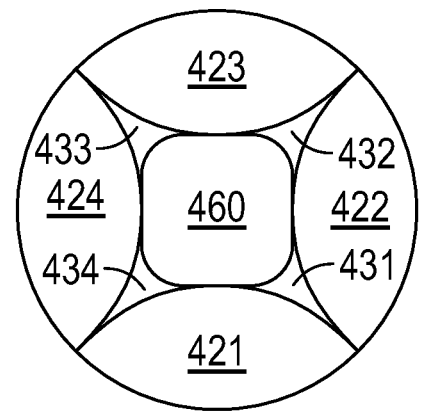
FIG. 10 depicts a top view of a multi-faceted shaped body of a surgical dilator as described in at least one embodiment herein.

FIG. 10 depicts an alternative embodiment of the single prong configuration of FIGS. 9A-9C, wherein the shaped tip 416 is covered by the blunt lead face 460 which is free of a tip lumen.

Figure 11A:
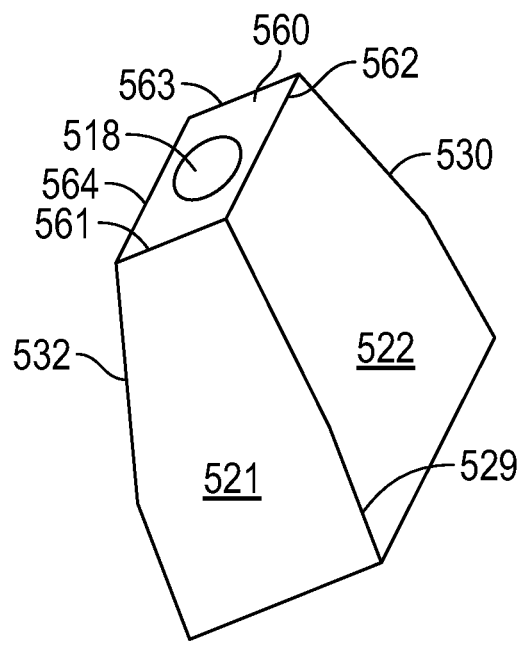
FIGS. 11A and 11B depict a perspective side view and top view, respectively, of a multi-faceted shaped body of a surgical dilator as described in at least one embodiment herein.
Figure 11B:
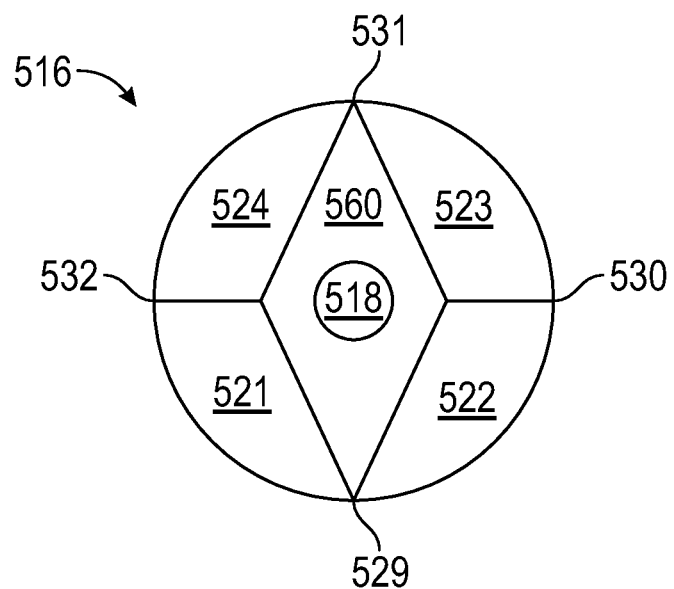

FIGS. 11A and 11B depict another alternative embodiment of the single prong configuration, wherein a multi-faceted shaped tip 516 includes only a plurality of major sides 521, 522, 523, and 524 connected to each other via a plurality of major cutting edges 529, 530, 531, and 532, and further connected on a leading part thereof to a blunt lead face 560 along major leading cutting edges 561, 563, 565, and 567. A tip lumen 518 may also optionally extend therethrough. In some embodiments, the blunt lead face 560 defines a diamond shape. In some embodiments, the multi-faceted tip 516 may be free of minor sides and/or minor cutting edges.

In some embodiments, the distal end portion of the dilator and the tapered multifaceted shaped tip may be a monolithic structure. In such embodiments, the distal end portion of the dilator and the tapered multifaceted shaped tip may be formed together using any suitable process including but not limited to one or more of extrusion, molding, casting, and/or pressing.

In some embodiments, the distal end portion of the dilator and the tapered multi-faceted shaped tip may be at least two separate pieces combined together to form the dilator. In such embodiments, the distal end portion of the dilator and the tapered multifaceted shaped tip may be formed separately using any suitable process including but not limited to extrusion, molding, casting, pressing, and combinations thereof. The separate pieces may be combined to form the dilator using any suitable method including but not limited to one or more of coextrusion, over-molding, swaging, crimping, pressing, adhesives, threads, and/or male/female connectors.

Figure 12:
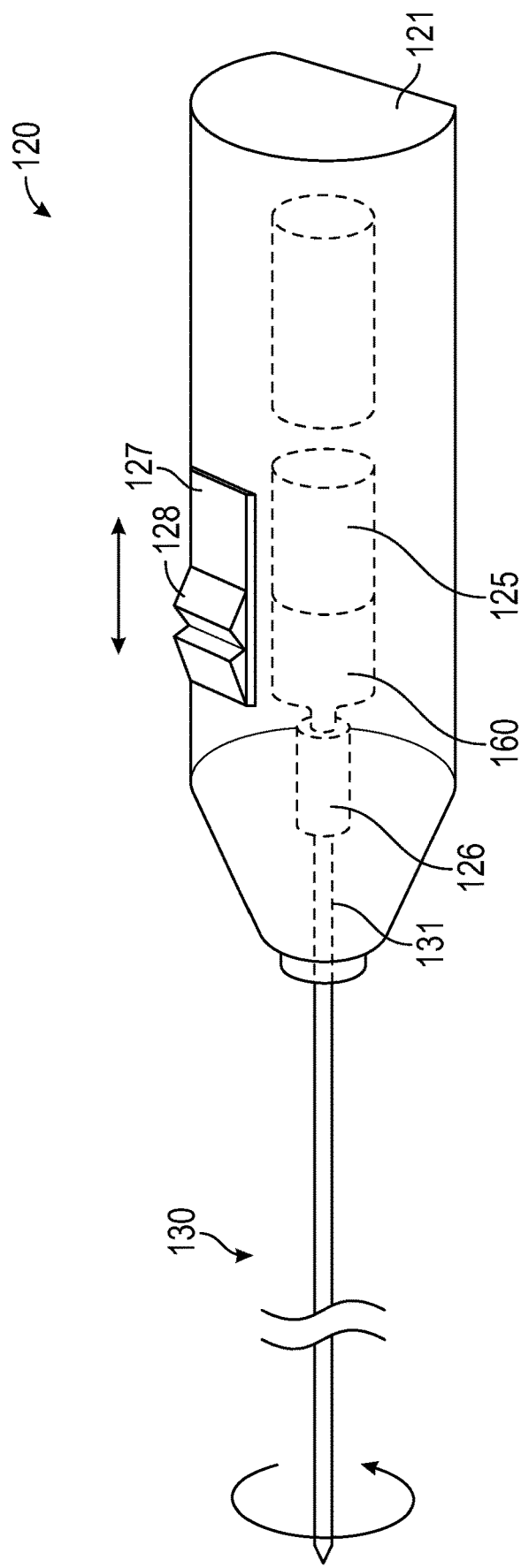
FIG. 12 depicts a schematic perspective view of a handle portion of a surgical dilator as described in at least one embodiment herein.

Turning to FIG. 12, in some embodiments, the handle 120 may be a power-operated control handle configured to rotate the tubular body 130 (and the distal tip associated therewith) of the surgical dilator. Control handle 120 includes a housing 121 configured to secure at least a motor 125 therein. The motor 125 operably coupled to the proximal end portion 131 of the tubular body 130 either directly or via a coupler 126. In some embodiments, the motor 125 may be operably coupled to a planetary gear 160 which is operably coupled to the proximal end portion of the tubular body 131.

As further shown in FIG. 12, the housing 121 may define at least one exterior channel 127 sized and dimensioned to receive actuator 128 configured to slide within the channel 127 to control and/or change the speed at which the body is rotated. In some embodiments, a second actuator (not shown) may be configured to further control the amount of torque applied to the tubular body or steer the distal end portion and/or tip of the surgical dilator.

Figure 13:
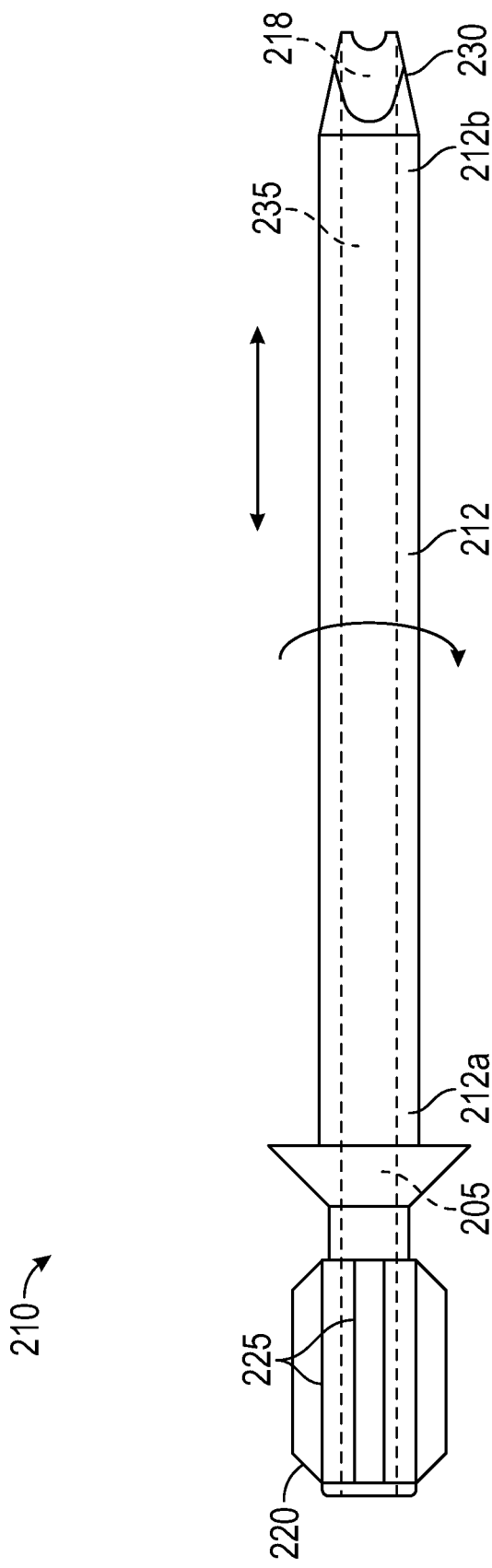
FIG. 13 depicts a side view of a surgical dilator as described in at least one embodiment herein.

Turning to FIG. 13, in some embodiments, a surgical dilator 210 as described herein may alternatively include a manually operated handle 220 affixed to a proximal end portion 212a of a tubular body 212 with a tapered multi-faceted tip 230 affixed to a distal end portion 212b of the body 212. The handle 220 may include a handle lumen 205 extending longitudinally therethrough and connecting to dilator lumen 235 extending through the body 212. The dilator lumen 235 may further connect to a tip lumen 218 extending through the tip 230. The handle 220 may include one or more grip members 225, such as grooves, bumps, etc. In some embodiments, the handle 220 may be a knurled knob. The handle 220 being configured to manually steer and/or rotate the dilator 210.

The surgical dilators described herein may be utilized to reach a desired target tissue and/or lesion located off-lumen. By the tissue or lesion being located off-lumen, the surgical dilator may be designed to: navigate through a given lumen to a given point near the target tissue or lesion; exit the lumen via an exit point created in the lumen wall by advancing and/or rotating the surgical dilator through the lumen wall; and creating a path beyond the lumen to the target or lesion by continuing to advance and/or rotate the surgical dilator in the direction of the target or lesion.

In some embodiments, a method for surgical dilator deployment to an off-lumen lesion includes: positioning and/or navigating a surgical dilator as described herein through a lumen of a patient, and particularly a lumen in the lungs, to a selected exit point in a wall of the lumen near the off-lumen lesion (FIG. 13A); advancing and/or rotating the surgical dilator, via the handle operably coupled thereto outside the patient, including the multi-faceted shaped tip, through the wall of the lumen (FIG. 13B); and creating a path beyond the lumen to the off-lumen lesion by rotating and/or advancing the surgical dilator outside the lumen and in a direction towards the lesion (FIG. 13C). Withdrawal of the surgical dilator may also occur.

In some embodiments, the rotation of the surgical dilator may be manually performed. In some embodiments, the rotation of the surgical dilator may be automatically performed by a power-operated handle or device.

Figure 14C:
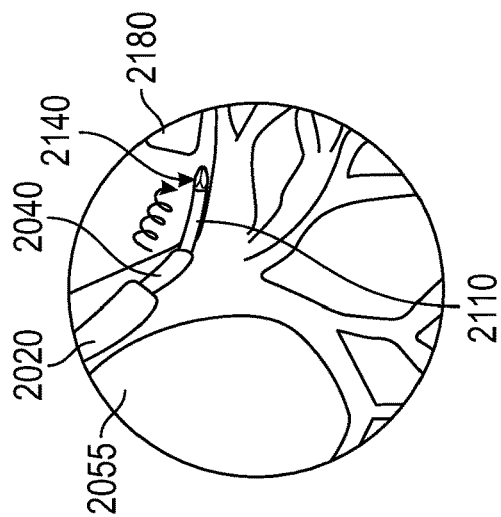
FIGS. 14B and 14C are enlarged detail views of the circled area of FIG. 14A.
Figure 14B:
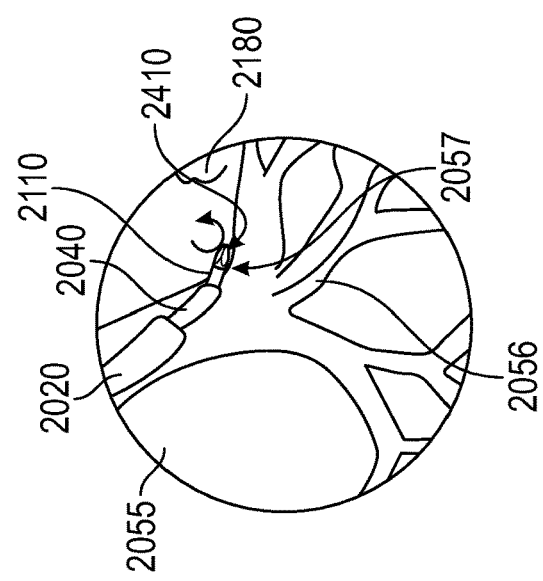
Figure 14A:
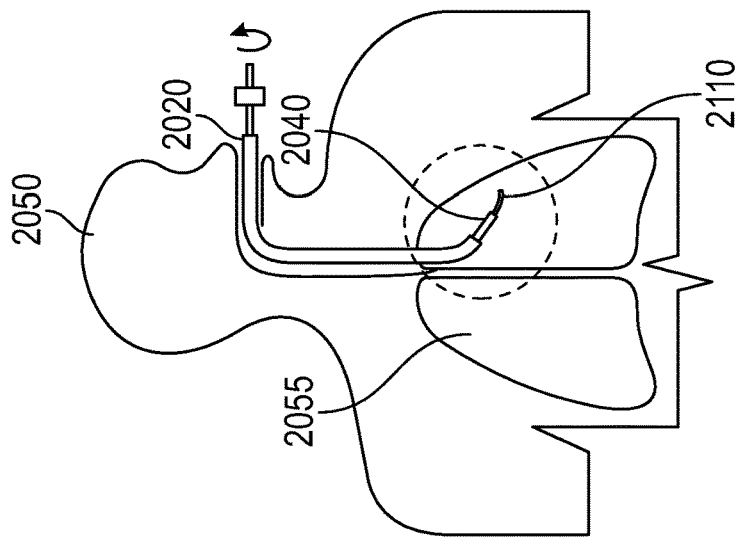
FIG. 14A is an illustration of a dilator assembly including a surgical dilator inserted into a lung as described in at least one embodiment herein.

FIG. 14A illustrates a bronchoscope 2020, a catheter 2040 and a surgical dilator 2110 as described herein inserted into the lungs 2050 via a natural orifice (e.g., the mouth) of a patient 2150 toward an off-lumen target or lesion 2180 following a pathway plan. The proximal ends, i.e., handles, of the bronchoscope 2020 and catheter 2040 are not shown for clarity purposes. When the bronchoscope 2020 reaches a certain location of the lung 2055, the bronchoscope 2020 becomes wedged and cannot go further into bronchial tree due to the size constraints. Then, the catheter 2040, with or without an extended working channel, may be used to navigate the luminal network towards an off-lumen target 2180. In some embodiments, the endoscope 2020, the catheter 2040 and/or the surgical dilator 2110 may follow a predetermined pathway plan associated and/developed using any known lung navigation software, e.g., the ILOGIC® planning suite software currently sold by Covidien LP.

FIG. 14B illustrates an enlarged detail view of the circled area of FIG. 14A, where the surgical dilator 2110, and particularly the distal multi-faceted tip 2140 of the surgical dilator (including any combination of configurations, sides, and/or cutting edges described herein), is advanced and/or rotated (see arrows) via the handle 2120 operably coupled thereto, through the wall 2057 of the lumen 2056 exiting the natural lumen 2056 of the lung 2055. Since the speed and/or torque of the rotation of the dilator 2110 may be controlled by the handles 2120, less force or push is required to advance the dilator 2110 through the lumen wall 2057. In addition, the stiffness of the dilator may remain stiffer than the catheter 2040 without causing the catheter to straighten or shift in position to become misaligned.

In some embodiments, the dilator and/or the multi-faceted tip may be rotated at a speed ranging from about 25 to about 2500 rpms In some other embodiments, the dilator and/or the multi-faceted tip may be rotated at a speed ranging from about 50 to about 1250 rpms In still other embodiments, the dilator and/or the multi-faceted tip may be rotated at a speed ranging from about 100 to about 1000 rpms.

FIG. 14C illustrates the surgical dilator 2110, and particularly the multi-faceted tip 2140 of the surgical dilator 2110, continuing to be rotated while advancing (see arrows) creating an off-lumen path beyond the wall 2057 and/or exit point of the lumen 2056 and in the direction of the off-lumen lesion 2180. The path being created by the rotating and/or advancing the surgical dilator 2110 outside of the lumen 2056 and in a direction towards the lesion 2180. The surgical dilator 2110 ultimately butting up against the target tissue or lesion 2180. At which point, the catheter 2040 may be extended over the surgical dilator 2110 to maintain the patency of the path and/or the surgical dilator 2110 may be withdrawn and replaced with any suitable surgical instrument to treat, resect, and/or biopsy the off-lumen tissue or lesion 2180.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting but merely as exemplifications of particular embodiments. Those skilled in the art will envision other modifications within the scope and spirit of the claims appended hereto.

What is claimed is:

1. A surgical dilator comprising:
a tubular body extending between a proximal end portion and a distal end portion, the tubular body defining a dilator lumen extending from a proximal opening at the proximal end portion to a distal opening at the distal end portion, and a tapered multi-faceted shaped tip extending along a longitudinal axis between a base portion and a lead portion, the base portion connected to the distal end portion of the tubular body, and the lead portion including a plurality of facets of the multi-faceted shaped tip, a control handle secured to the proximal end portion of the tubular body, the control handle having a rotatable grip operably coupled to one or more gears configured to rotate the multi-faceted shaped tip about the longitudinal axis to cause the plurality of facets to cut through tissue in a distal direction towards a target, wherein the one or more gears includes at least a sun gear.

2. The surgical dilator of claim 1, wherein the tapered multi-faceted shaped tip further comprises a tip lumen extending from a base opening at the base portion to a lead opening at the lead portion, the base opening aligning at least partially with the distal opening.

3. The surgical dilator of claim 2, wherein the tip lumen comprises a tapered tip lumen.

4. The surgical dilator of claim 2, wherein the tapered multi-faceted shaped tip comprises a tri-faceted configuration.

5. The surgical dilator of claim 2, wherein the tapered multi-faceted shaped tip comprises a tetra-faceted configuration.

6. The surgical dilator of claim 1, wherein the sun gear is a central sun gear and the one or more gears includes the central sun gear surrounded by a plurality of planetary gears located within an outer gear ring.

7. The surgical dilator of claim 6, wherein the control handle is operably coupled to the outer gear which is operably coupled to the central sun gear via the plurality of planetary gears, wherein rotation of the rotatable grip causes the outer gear to rotate at a first speed and first torque which further causes the central sun gear and the plurality of planetary gears to rotate at a higher speed than the first speed or at a lower torque than the first torque.

8. The surgical dilator of claim 6, wherein the control handle is operably coupled to the central sun gear which is operably coupled to the outer gear via the plurality of planetary gears, wherein rotation of the rotatable grip causes the central sun gear to rotate at a first speed and first torque which further causes the outer gear and the plurality of planetary gears to rotate at a lower speed than the first speed or at a higher torque than the first torque.

9. A surgical dilator assembly comprising:
a dilator including a tubular body extending between a proximal end portion and a distal end portion, the tubular body defining a dilator lumen extending from a proximal opening at the proximal end portion to a distal opening at the distal end portion, and a tapered multi-faceted shaped tip extending along a longitudinal axis between a base portion and a lead portion defining a tip lumen extending from a base opening to a lead opening, the base opening of the tip lumen connected to the distal opening of the dilator lumen, and the lead portion including a plurality of facets of the multi-faceted shaped tip, a control handle secured to the proximal end portion of the tubular body, the control handle having a rotatable grip operably coupled to one or more gears configured to rotate the multi-faceted shaped tip about the longitudinal axis to cause the plurality of facets to cut through tissue in a distal direction towards a target, wherein the one or more gears includes at least a sun gear, a guidewire extending between a proximal end portion and a distal end portion, the guidewire configured to pass through and extend distally from the dilator lumen and the tip lumen of the dilator, and, optionally one or more of a guide catheter or endoscope configured to receive the dilator and guidewire therethrough.

10. The surgical dilator assembly of claim 9, wherein the sun gear is a central sun gear and the one or more gears includes the central sun gear surrounded by a plurality of planetary gears located within an outer gear ring.

11. The surgical dilator assembly of claim 10, wherein the control handle is operably coupled to the outer gear which is operably coupled to the central sun gear via the plurality of planetary gears, wherein rotation of the rotatable grip causes the outer gear to rotate at a first speed and first torque which further causes the central sun gear and the plurality of planetary gears to rotate at a higher speed than the first speed or at a lower torque than the first torque.

12. The surgical dilator assembly of claim 10, wherein the control handle is operably coupled to the central sun gear which is operably coupled to the outer gear via the plurality of planetary gears, wherein rotation of the rotatable grip causes the central sun gear to rotate at a first speed and first torque which further causes the outer gear and the plurality of planetary gears to rotate at a lower speed than the first speed or at a higher torque than the first torque.

13. A surgical kit comprising:
a tubular body extending between a proximal end portion and a distal end portion, the tubular body defining a dilator lumen extending from a proximal opening at the proximal end portion to a distal opening at the distal end portion, and a tapered multi-faceted shaped tip extending along a longitudinal axis between a base portion and a lead portion, the base portion connected to the distal end portion of the tubular body, a control handle secured to the proximal end portion of the tubular body, the control handle having a rotatable grip operably coupled to one or more gears configured to rotate the multi-faceted shaped tip about the longitudinal axis to cause the plurality of facets to cut through tissue in a distal direction towards a target, wherein the one or more gears includes at least a sun gear, and
one or more of a guidewire, guide catheter, or endoscope.

14. The surgical kit of claim 13, wherein the sun gear is a central sun gear and the one or more gears includes the central sun gear surrounded by a plurality of planetary gears located within an outer gear ring.

15. The surgical kit of claim 14, wherein the control handle is operably coupled to the outer gear which is operably coupled to the central sun gear via the plurality of planetary gears, wherein rotation of the rotatable grip causes the outer gear to rotate at a first speed and first torque which further causes the central sun gear and the plurality of planetary gears to rotate at a higher speed than the first speed or at a lower torque than the first torque.

16. The surgical kit of claim 14, wherein the control handle is operably coupled to the central sun gear which is operably coupled to the outer gear via the plurality of planetary gears, wherein rotation of the rotatable grip causes the central sun gear to rotate at a first speed and first torque which further causes the outer gear and the plurality of planetary gears to rotate at a lower speed than the first speed or at a higher torque than the first torque.

\* \* \* \* \*